United States Patent
Komuro et al.

(10) Patent No.: US 12,152,124 B2
(45) Date of Patent: Nov. 26, 2024

(54) ETHYLENE-VINYL ALCOHOL COPOLYMER COMPOSITION, ETHYLENE-VINYL ALCOHOL COPOLYMER COMPOSITION FOR MELT FORMING, PELLETS, AND MULTILAYER STRUCTURE

(71) Applicant: Mitsubishi Chemical Corporation, Tokyo (JP)

(72) Inventors: Ryohei Komuro, Tokyo (JP); Shintaro Usui, Tokyo (JP); Daichi Nishimura, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/695,939

(22) Filed: Nov. 26, 2019

(65) Prior Publication Data

US 2020/0095396 A1  Mar. 26, 2020

Related U.S. Application Data

(63) Continuation of application No. PCT/JP2018/024306, filed on Jun. 27, 2018.

(30) Foreign Application Priority Data

Jun. 27, 2017 (JP) ................... 2017-125564
Jul. 5, 2017 (JP) ................... 2017-131682

(51) Int. Cl.
| | |
|---|---|
| *C08K 3/11* | (2018.01) |
| *B29B 7/00* | (2006.01) |
| *B29B 7/72* | (2006.01) |
| *B29B 9/12* | (2006.01) |
| *B29K 23/00* | (2006.01) |
| *B32B 7/12* | (2006.01) |
| *B32B 25/08* | (2006.01) |

(Continued)

(52) U.S. Cl.
CPC ............... *C08K 3/11* (2018.01); *B29B 7/007* (2013.01); *B29B 7/726* (2013.01); *B29B 9/12* (2013.01); *B32B 7/12* (2013.01); *B32B 25/08* (2013.01); *B32B 25/14* (2013.01); *B32B 27/08* (2013.01); *B32B 27/18* (2013.01); *B32B 27/20* (2013.01); *B32B 27/22* (2013.01); *B32B 27/302* (2013.01); *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 37/153* (2013.01); *C08F 6/02* (2013.01); *C08K 3/32* (2013.01); *C08K 13/02* (2013.01); *B29B 9/06* (2013.01); *B29K 2023/086* (2013.01); *B29K 2105/0044* (2013.01); *B32B 2250/24* (2013.01); *B32B 2270/00* (2013.01); *B32B 2307/73* (2013.01); *B32B 2307/732* (2013.01); *B32B 2439/46* (2013.01); *B32B 2439/60* (2013.01); *B32B 2439/70* (2013.01); *B32B 2439/80* (2013.01); *C08K 2003/328* (2013.01); *C08K 5/098* (2013.01)

(58) Field of Classification Search
CPC ........... B29B 9/12; B29B 7/007; B29B 7/726; B29B 9/06; B29K 2023/086; B29K 2105/0044; B32B 7/12; B32B 27/08; B32B 27/18; B32B 27/306; B32B 27/32; B32B 27/34; B32B 27/22; B32B 27/308; B32B 37/153; B32B 25/08; B32B 27/20; B32B 27/304; B32B 27/325; B32B 27/36; B32B 27/365; B32B 27/302; B32B 25/14; B32B 2439/70; B32B 2439/80; B32B 2439/60; B32B 2307/73; B32B 2307/732; B32B 2250/24; B32B 2439/46; B32B 2270/00; C08K 3/11; C08K 3/32; C08K 13/02; C08K 2003/328; C08K 5/098; C08F 6/02
See application file for complete search history.

(56) References Cited

U.S. PATENT DOCUMENTS

| | | | |
|---|---|---|---|
| 5,034,281 A | 7/1991 | Kawasaki et al. | |
| 5,082,743 A | 1/1992 | Itamura et al. | |

(Continued)

FOREIGN PATENT DOCUMENTS

| | | |
|---|---|---|
| CN | 1392889 A | 1/2003 |
| CN | 101910294 | 12/2010 |

(Continued)

OTHER PUBLICATIONS

Machine English translation of WO 2013/146533, Mori et al., Oct. 2013.*

(Continued)

*Primary Examiner* — Patrick D Niland
(74) *Attorney, Agent, or Firm* — GREENBLUM & BERNSTEIN, P.L.C.

(57) ABSTRACT

An ethylene-vinyl alcohol copolymer composition contains: (A) an ethylene-vinyl alcohol copolymer; (B) a long Periodic Table 4th-period d-block metal compound; and (C) an iron compound; wherein the iron compound (C) is present in an amount of 0.01 to 5 ppm on a metal basis based on the weight of the ethylene-vinyl alcohol copolymer composition. The ethylene-vinyl alcohol copolymer composition exhibits improved impact resistance and heat stability (color tone deterioration-suppressing effect and coloration-suppressing effect).

9 Claims, No Drawings

(51) Int. Cl.
*B32B 25/14* (2006.01)
*B32B 27/08* (2006.01)
*B32B 27/18* (2006.01)
*B32B 27/20* (2006.01)
*B32B 27/22* (2006.01)
*B32B 27/30* (2006.01)
*B32B 27/32* (2006.01)
*B32B 27/34* (2006.01)
*B32B 27/36* (2006.01)
*B32B 37/15* (2006.01)
*C08F 6/02* (2006.01)
*C08K 3/32* (2006.01)
*C08K 13/02* (2006.01)
*B29B 9/06* (2006.01)
*B29K 105/00* (2006.01)
*C08K 5/098* (2006.01)

(56) References Cited

U.S. PATENT DOCUMENTS

| | | | |
|---|---|---|---|
| 6,232,382 B1 | 5/2001 | Ninomiya et al. | |
| 6,759,107 B1 | 7/2004 | Tai et al. | |
| 2003/0022974 A1 | 1/2003 | Tai et al. | |
| 2005/0032955 A1* | 2/2005 | Nakano | C08L 29/04 524/394 |
| 2010/0285273 A1 | 11/2010 | Abe et al. | |
| 2010/0289172 A1 | 11/2010 | Fujimura et al. | |
| 2010/0314791 A1 | 12/2010 | Fujimura et al. | |
| 2014/0213701 A1 | 7/2014 | Nonaka et al. | |
| 2016/0229987 A1 | 8/2016 | Kawai et al. | |

FOREIGN PATENT DOCUMENTS

| | | | |
|---|---|---|---|
| CN | 103635526 | | 3/2014 |
| CN | 104185652 A | | 12/2014 |
| EP | 1316582 A1 | | 6/2003 |
| JP | 58-222102 | | 12/1983 |
| JP | 61-220839 | | 10/1986 |
| JP | 62-152847 | | 7/1987 |
| JP | 01-279949 | | 11/1989 |
| JP | 03-192140 | | 8/1991 |
| JP | 06-128433 | | 5/1994 |
| JP | 07-330994 | | 10/1995 |
| JP | H08-118552 A | | 5/1996 |
| JP | 11-106592 | | 4/1999 |
| JP | 2000-136281 | | 5/2000 |
| JP | 2001-072873 A | | 3/2001 |
| JP | 2001-115274 | | 4/2001 |
| JP | 2001-347612 | | 12/2001 |
| JP | 2002-045851 | | 2/2002 |
| JP | 2006-096816 | | 4/2006 |
| JP | 2008-230112 | | 10/2008 |
| JP | WO 2013/146533 | * | 10/2013 |
| JP | 2015-083377 | | 4/2015 |
| TW | I417308 | | 12/2013 |
| WO | 2008/149642 | | 5/2008 |
| WO | 2013/146533 | | 10/2013 |

OTHER PUBLICATIONS

European Search Report issued in European Patent Application No. 18823576.6 dated Jun. 5, 2020.
Singaporean Office Action issued in SG Patent Application No. 11201911319T, mailing date: Nov. 9, 2020.
ISR issued in WIPO Patent App. No. PCT/JP2018/024306, dated Aug. 14, 2018, English translation.
IPRP issued in WIPO Patent App. No. PCT/JP2018/024306, dated Dec. 31, 2019, English translation.
ISR issued in WIPO Patent Application No. PCT/JP2016/089122, dated Feb. 7, 2017, English translation.
IPRP issued in WIPO Patent Application No. PCT/JP2016/089122, dated Jul. 3, 2018, English translation.
Office Action issued in SINGAPORE Counterpart Patent Appl. No. 11201804720P, dated Jun. 26, 2019.
Office Action issued in Taiwan Patent Application No. 107122173, Sep. 16, 2021, English translation.
Office Action issued in Japan Patent Application No. 2018-534187, Sep. 21, 2021, English translation.
Office Action issued in Chinese Patent Application No. 201880034959.3, Sep. 28, 2021, English translation.
Office Action issued in European Patent Application No. 18823576.6, Dec. 21, 2022.
Singaporean Office Action issued in SINGAPORE Counterpart Patent Appl. No. 11201911319T, dated Jul. 28, 2022.
Taiwanese Office Action issued in Taiwanese Counterparttranslation.
Search Report attached to Chinese Notice of AllowanceAugust 25, 2022, with English translation.
Xiaodong et al., English translation of "Study on Performance and Blending Modification of Ethylene-Vinyl Alcohol Copolymer", p. 448-450, 2006.

* cited by examiner

ETHYLENE-VINYL ALCOHOL COPOLYMER COMPOSITION, ETHYLENE-VINYL ALCOHOL COPOLYMER COMPOSITION FOR MELT FORMING, PELLETS, AND MULTILAYER STRUCTURE

RELATED APPLICATION

This application is a continuation of International Application No. PCT/JP2018/024306, filed on Jun. 27, 2018, which claims priority to Japanese Patent Application No. 2017-125564, filed on Jun. 27, 2017, and 2017-131682, filed on Jul. 5, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter sometimes referred to simply as "EVOH resin") as a major component, an EVOH resin composition for melt forming, pellets, and a multilayer structure. More specifically, the present disclosure relates to an EVOH resin composition, an EVOH resin composition for melt forming, pellets, and a multilayer structure that are excellent in impact resistance and heat stability.

BACKGROUND ART

The EVOH resin has crystalline portions formed due to firm hydrogen bonds between hydroxyl groups richly present in its molecular chains, and these crystalline portions prevent intrusion of oxygen from the outside. Therefore, the EVOH resin is excellent in gas barrier properties, e.g., oxygen barrier property. The EVOH resin is generally used for an intermediate layer laminated with other resin in a multilayer structure, and is widely used as various packaging materials such as food packaging materials, pharmaceutical product packaging materials, industrial chemical packaging materials, and agricultural chemical packaging materials.

As described above, the EVOH resin is excellent in gas barrier properties, but tends to be brittle because of its higher crystallinity due to the hydroxyl groups richly present in its molecular chains. Therefore, the EVOH resin layer of the multilayer structure is liable to suffer from cracking and pinholes to be thereby broken by impact or the like.

For improvement of the impact resistance of the EVOH resin, for example, PTL 1 and PTL 2 disclose laminate packages each including a layer of a resin composition containing an EVOH resin and an ethylene-vinyl acetate copolymer. Further, PTL 3 and PTL 4 disclose laminates each including a layer of a resin composition containing an EVOH resin and a partially saponified ethylene-vinyl acetate copolymer.

The EVOH resin contains relatively active hydroxyl groups in its molecules and, therefore, is liable to experience oxidation reaction and crosslinking reaction when being melted at a higher temperature even in a generally oxygen-free environment within an extruder. This tends to cause coloration, gelation, and other problems. To solve these problems, for example, PTL 5 discloses a resin composition that contains: (A) a saponified ethylene-vinyl acetate copolymer having an ethylene content of 20 to 60 mol % and a saponification degree of not less than 90 mol %; (B) acetic acid; and (C) magnesium acetate and/or calcium acetate; wherein the component (B) is present in an amount of not greater than 0.05 parts by weight based on 100 parts by weight of the component (A); wherein the component (C) is present in an amount of 0.001 to 0.02 parts by weight on a metal basis based on 100 parts by weight of the component (A). The resin composition is excellent in long-run melt formability, and can provide a formed product excellent in appearance substantially without fisheyes, streaks, and coloration. Where the formed product is provided in the form of a laminate, the laminate is less susceptible to odor emanation. The resin composition ensures excellent interlayer adhesiveness of the laminate even after the laminate is subjected to secondary processes such as stretching and deep drawing.

RELATED ART DOCUMENT

Patent Document

PTL 1: JP-A-SHO61(1986)-220839
PTL 2: JP-A-SHO62(1987)-152847
PTL 3: JP-A-HEI1(1989)-279949
PTL 4: JP-A-HEI3(1991)-192140
PTL 5: JP-A-HEI11(1999)-106592

SUMMARY

In PTL 1 to PTL 5, however, the EVOH resin is partly replaced with a resin other than the EVOH resin. Therefore, the proportion of the EVOH resin in the resin compositions is reduced, so that the resin compositions tend to be poorer in gas barrier properties attributable to the EVOH resin.

With the spread of internet shopping and the economic development of developing countries in recent years, article distribution has been rapidly globalized. Therefore, the transportation of foods, chemicals, and other articles tends to require longer transportation periods. Hence, there is a demand for a multilayer structure excellent in gas barrier properties and impact resistance, i.e., having a higher resistance to fall and collision during longer-period transportation and handling.

Further, forming apparatuses tend to have higher functionalities to cope with diversification of feed block and die shapes of the forming apparatuses and higher functional requirements for layer thickness reduction and layer number increase of multilayer structures to be formed as final products by the forming apparatuses. On the other hand, the resin is liable to deteriorate in such a forming apparatus having an internal structure complicated due to the higher functional requirements. This tends to result in coloration of the resin, thereby reducing product productivity. Therefore, the resin composition needs further improvement.

It is known that common metal compounds (e.g., alkali metal (sodium, potassium, and the like) salts and alkali earth metal (calcium, magnesium, and the like) salts of organic acids such as acetic acid, propionic acid, butyric acid, lauric acid, stearic acid, oleic acid, and behenic acid; and alkali metal (sodium, potassium, and the like) salts and alkali earth metal (calcium, magnesium, and the like) salts of inorganic acids such as sulfuric acid, sulfurous acid, carbonic acid, phosphoric acid, and boric acid) promote the thermal decomposition of the EVOH resin, reduce the impact resistance of the EVOH resin composition, and deteriorate the color tone of the EVOH resin composition during the heating of the EVOH resin composition. Those skilled in the art generally refrain from blending any of the aforementioned metal compounds with the EVOH resin when making attempts to improve the mechanical property (impact resistance) of the EVOH resin composition while suppressing the deterioration in the color tone of the EVOH resin during the heating. However, the inventors unexpectedly found that, where a long Periodic Table 4th-period d-block metal compound and a very small amount of an iron compound are used in combination with the EVOH resin, the resulting EVOH resin composition has gas barrier properties, and excellent heat stability (color tone deterioration-suppressing effect and coloration-suppressing effect), and is improved in mechanical property (impact resistance).

According to a first aspect of the present disclosure, there is provided an EVOH resin composition containing: (A) an EVOH resin; (B) a compound of a long Periodic Table 4th-period d-block metal; and (C) an iron compound; wherein the iron compound (C) is present in an amount of 0.01 to 5 ppm on a metal basis based on the weight of the EVOH resin composition. According to a second aspect of the present disclosure, there is provided an EVOH resin composition for melt forming, which contains the above EVOH resin composition. According to a third aspect of the present disclosure, pellets formed from the EVOH resin composition are provided. According to a fourth aspect of the present disclosure, a multilayer structure including a layer formed from the EVOH resin composition is provided.

The EVOH resin composition of the present disclosure contains the EVOH resin (A), the long Periodic Table 4th-period d-block metal compound (B), and the iron compound (C). In the EVOH resin composition, the iron compound (C) is present in an amount of 0.01 to 5 ppm on a metal basis based on the weight of the EVOH resin composition. The EVOH resin composition is excellent in film impact resistance and heat stability (color tone deterioration-suppressing effect and coloration-suppressing effect).

Where the long Periodic Table 4th-period d-block metal compound (B) is present in an amount of 0.1 to 500 ppm on a metal basis based on the weight of the EVOH resin composition, the EVOH resin composition is more excellent in film impact resistance and heat stability (color tone deterioration-suppressing effect and coloration-suppressing effect).

Where the weight ratio of the amount of the long Periodic Table 4th-period d-block metal compound (B) on a metal basis to the amount of the iron compound (C) on a metal basis is 0.02 to 50,000, the EVOH resin composition is still more excellent in film impact resistance and heat stability (color tone deterioration-suppressing effect and coloration-suppressing effect).

Where the long Periodic Table 4th-period d-block metal compound (B) is a zinc compound, the EVOH resin composition is more excellent in film impact resistance and heat stability (color tone deterioration-suppressing effect and coloration-suppressing effect).

Where the long Periodic Table 4th-period d-block metal compound (B) is a carboxylate of the long Periodic Table 4th-period d-block metal, the EVOH resin composition is still more excellent in film impact resistance and heat stability (color tone deterioration-suppressing effect and coloration-suppressing effect).

The EVOH resin composition for melt forming that contains the EVOH resin composition of the present disclosure is excellent in impact resistance and heat stability (color tone deterioration-suppressing effect and coloration-suppressing effect). Therefore, the EVOH resin composition for melt forming is useful for various packaging materials for general foods, condiments such as mayonnaise and dressing, fermented foods such as miso, fat and oil such as salad oil, beverages, cosmetics, and pharmaceutical products.

The pellets formed from the EVOH resin composition of the present disclosure are excellent in impact resistance and heat stability (color tone deterioration-suppressing effect and coloration-suppressing effect). Therefore, the pellets are useful as a material for various packaging materials for general foods, condiments such as mayonnaise and dressing, fermented foods such as miso, fat and oil such as salad oil, beverages, cosmetics, and pharmaceutical products.

The multilayer structure including the layer formed from the EVOH resin composition of the present disclosure is excellent in impact resistance and heat stability (color tone deterioration-suppressing effect and coloration-suppressing effect). Therefore, the multilayer structure is useful for various packaging materials for general foods, condiments such as mayonnaise and dressing, fermented foods such as miso, fat and oil such as salad oil, beverages, cosmetics, and pharmaceutical products.

DESCRIPTION OF EMBODIMENTS

Preferred embodiments of the present disclosure will hereinafter be described in detail. It should be understood that these preferred embodiments are illustrative but not limitative.

An EVOH resin composition of the present disclosure contains: (A) an EVOH resin as a major component; (B) a compound of a long Periodic Table 4th-period d-block metal; and (C) an iron compound. In the EVOH resin composition of the present disclosure, the EVOH resin (A) is present as a base resin. That is, the proportion of the EVOH resin (A) in the EVOH resin composition is typically not less than 70 wt. %, preferably not less than 80 wt. %, more preferably not less than 90 wt. %, particularly preferably not less than 95 wt. %.

The respective components will hereinafter be described in turn.

[EVOH Resin (A)]

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH resin can be controlled by adjusting the pressure of ethylene to be supplied when the vinyl ester monomer and ethylene are copolymerized. The ethylene structural unit content of the EVOH resin is typically 20 to 60 mol %, preferably 25 to 50 mol %, particularly preferably 25 to 35 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The ethylene structural unit content may be measured in conformity with ISO14663.

The vinyl ester saponification degree of the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The saponification degree of the EVOH resin (A) is measured in conformity with JIS K6726 (with the use of a solution obtained by homogenously dissolving the EVOH resin in a water/methanol solvent).

The EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH resin (A) is excessively high, the film formability tends to be unstable. If the MFR of the EVOH resin (A) is excessively low, the EVOH resin composition tends to have an excessively high viscosity, making melt extrusion difficult.

The MFR, which is an index of the polymerization degree of the EVOH resin, can be controlled by adjusting the amount of a polymerization initiator and the amount of a solvent in the copolymerization of ethylene and the vinyl ester monomer.

The EVOH resin (A) to be used in the present disclosure may further contain a structural unit derived from any of the following comonomers in an amount (e.g., not greater than 10 mol % of the EVOH resin (A)) that does not impair the effects of the present disclosure.

The comonomers include: olefins such as propylene, 1-butene, and isobutene, hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is particularly preferred because of its gas barrier property and excellent secondary formability. Particularly, an EVOH resin prepared by copolymerization with the hydroxyl-containing α-olefin is preferred, and an EVOH resin having a 1,2-diol structure in its side chain is especially preferred.

Particularly, where the EVOH resin having a primary hydroxyl group in its side chain is used, the content of a structural unit derived from the primary hydroxyl-containing monomer is typically 0.1 to 20 mol %, preferably 0.5 to 15 mol %, particularly preferably 1 to 10 mol %, of the EVOH resin.

The EVOH resin (A) to be used in the present disclosure may be a post-modified EVOH resin such as a urethanized, acetalized, cyanoethylated or oxyalkylenated EVOH resin.

The EVOH resin (A) to be used in the present disclosure may be a mixture of different EVOH resins. These EVOH resins may have different saponification degrees, and different polymerization degrees, and contain different comonomer components.

[Long Periodic Table 4th-Period d-Block Metal Compound (B)]

The EVOH resin composition of the present disclosure contains the long Periodic Table 4th-period d-block metal compound (B). The amount of the long Periodic Table 4th-period d-block metal compound (B) contained in the EVOH resin composition is typically 0.1 to 500 ppm, preferably 1 to 300 ppm, more preferably 3 to 200 ppm, particularly preferably 8 to 150 ppm, on a metal basis based on the weight of the overall EVOH resin composition.

If the amount of the long Periodic Table 4th-period d-block metal compound (B) is excessively great, the heat stability is liable to be impaired. If the amount of the long Periodic Table 4th-period d-block metal compound (B) is excessively small, the effects of the present disclosure are liable to be insufficient.

The amount of the long Periodic Table 4th-period d-block metal compound (B) is based on the EVOH resin composition as a final product that includes the EVOH resin (A), the long Periodic Table 4th-period d-block metal compound (B), the iron compound (C), and optional additives.

Examples of the long Periodic Table 4th-period d-block metal compound (B) to be used in the present disclosure include compounds of long Periodic Table 4th-period d-block metals such as scandium, titanium, vanadium, chromium, manganese, cobalt, nickel, copper, and zinc. Of these, the zinc compound is preferred because the effects of the present disclosure can be easily provided.

Specific examples of the long Periodic Table 4th-period d-block metal compound (B) to be used in the present disclosure include salts, oxides, and hydroxides of the long Periodic Table 4th-period d-block metals. Of these, the long Periodic Table 4th-period d-block metal oxides and salts are preferred from the viewpoint of economy and dispersibility. Further, the long Periodic Table 4th-period d-block metal salts are preferred because the effects of the present disclosure can be easily provided.

Examples of the long Periodic Table 4th-period d-block metal salts include inorganic salts such as carbonates, hydrogencarbonates, phosphates, borates, sulfates, and chlorides of the long Periodic Table 4th-period d-block metals, and organic salts such as carboxylates of the long Periodic Table 4th-period d-block metals.

Of these, the carboxylates of the long Periodic Table 4th-period d-block metals are particularly preferred, because the effects of the present disclosure can be easily provided.

The anion moieties of the carboxylates typically each have a carbon number of 2 to 25, and preferably each have a carbon number of 2 to 22, particularly preferably 4 to 20, especially preferably 6 to 12, for the productivity.

As the long Periodic Table 4th-period d-block metal compound (B), the zinc compounds are preferred, and zinc carboxylates are more preferred. The anion moieties of the zinc carboxylates preferably each have a carbon number of 2 to 25, more preferably 2 to 22, particularly preferably 4 to 20, especially preferably 6 to 12.

From the viewpoint of commercial availability, the carboxylates are typically saturated carboxylates of the long Periodic Table 4th-period d-block metals, but may be unsaturated carboxylates of the long Periodic Table 4th-period d-block metals. Examples of the saturated carboxylates include monocarboxylates such as acetates, butyrates, propionates, enanthates, caprylates, caprates, laurates, palmitates, stearates, 12-hydroxystearates, behenates, and montanates of the long Periodic Table 4th-period d-block metals, and dicarboxylates such as oxalates, malonates, succinates, adipates, suberates, and sebacates of the long Periodic Table 4th-period d-block metals, which may be used alone or in combination. From the viewpoint of the commercial availability, linear saturated carboxylates of the long Periodic Table 4th-period d-block metals are preferred, and the monocarboxylates of the long Periodic Table 4th-period d-block metals are more preferred. The butyrates, caproates, caprylates, caprates, laurates, and stearates of the long Periodic Table 4th-period d-block metals are particularly preferred, and the caproates, caprylates, caprates, and laurates of the long Periodic Table 4th-period d-block metals are especially preferred.

The long Periodic Table 4th-period d-block metal compounds described above may be used alone or in combination as the long Periodic Table 4th-period d-block metal compound (B) in the present disclosure. Where plural types of long Periodic Table 4th-period d-block metal compounds are used as the metal compound (B), the amount of the metal compound (B) is the total amount of these long Periodic Table 4th-period d-block metal compounds on a metal basis.

From the viewpoint of the dispersibility and the productivity of the EVOH resin composition, the long Periodic Table 4th-period d-block metal compound (B) typically has a molecular weight of 100 to 10,000, preferably 150 to 1,000, particularly preferably 200 to 800.

The long Periodic Table 4th-period d-block metal compound (B) to be used in the present disclosure preferably excludes inorganic lamellar compounds such as montmorillonite and double salts such as hydrotalcites from the viewpoint of the economy and the dispersibility.

The long Periodic Table 4th-period d-block metal compound (B) may be used in any form, e.g., solid form (powdery form, particulate form or flake form), semisolid form, liquid form, paste form, solution form, emulsion form (aqueous dispersion form) or the like. Particularly, the powdery form is preferred for easy handling.

The amount (on a metal basis) of the long Periodic Table 4th-period d-block metal compound (B) contained in the EVOH resin composition of the present disclosure is determined, for example, by heating and ashing the EVOH resin composition, treating the resulting ash with an acid such as hydrochloric acid, adding purified water to the resulting solution to a predetermined volume to prepare a sample liquid, and analyzing the sample liquid by an atomic absorption spectrometer.

[Iron Compound (C)]

The EVOH resin composition of the present disclosure contains the EVOH resin (A), the long Periodic Table 4th-period d-block metal compound (B), and the iron compound (C). In the EVOH resin composition, the iron compound (C) is present in a specific very small amount. With this arrangement, the EVOH resin composition is excellent in impact resistance and heat stability (color tone deterioration-suppressing effect and coloration-suppressing effect).

An EVOH resin composition prepared by adding either the long Periodic Table 4th-period d-block metal compound (B) or the iron compound (C) to the EVOH resin (A) tends to be insufficient in at least one of impact resistance and heat stability (color tone deterioration-suppressing effect and coloration-suppressing effect). A mechanism for this tendency is not clarified, but the insufficient impact resistance is supposedly because the EVOH resin composition is made basic by the addition of either the long Periodic Table 4th-period d-block metal compound (B) or the iron compound (C), and some anion serving as a nucleophilic agent removes hydrogens from main chain carbons of the EVOH resin (A), whereby the main chain of the EVOH resin (A) experiences a decomposition reaction to be broken. The insufficient heat stability (color tone deterioration-suppressing effect and coloration-suppressing effect) is supposedly because double bond structures are formed in the main chain of the EVOH resin (A) during the decomposition reaction, and serve as reaction starting points again to cause a dehydration reaction and the like, whereby polyene structures are formed in the main chain of the EVOH resin (A).

In the present disclosure, the EVOH resin composition is imparted with excellent heat stability (color tone deterioration-suppressing effect and coloration-suppressing effect) and an improved mechanical property (impact resistance) by using the long Periodic Table 4th-period d-block metal compound (B) and a specific very small amount of the iron compound (C) in combination. That is, the iron compound (C) provides stable trivalent iron ions and, even with a very small amount of the iron compound (C), the iron ions form chelates with the double bonds in the main chain of the EVOH resin (A) to be stabilized, thereby supposedly suppressing the excessive decomposition reaction of the EVOH resin (A) that may otherwise reduce the impact resistance, and the formation of the polyene structures that may otherwise reduce the heat stability.

The amount of the iron compound (C) contained in the EVOH resin composition of the present disclosure is 0.01 to 5 ppm, preferably 0.03 to 4 ppm, particularly preferably 0.04 to 3 ppm, especially preferably 0.05 to 2 ppm, on a metal basis based on the weight of the EVOH resin composition.

If the amount of the iron compound (C) is excessively small, the effects of the present disclosure tend to be insufficient. If the amount of the iron compound (C) is excessively great, on the other hand, the heat stability (color tone deterioration-suppressing effect and coloration-suppressing effect) and the mechanical property (impact resistance) tend to be deteriorated.

The amount of the iron compound (C) is determined in the following manner.

<Analysis of Iron Compound (C)>

A sample solution is prepared by pulverizing pellets of the EVOH resin composition, ashing 0.5 g of the pulverized EVOH resin composition in an oxygen stream at 650° C. for 1 hour in an infrared heating oven, dissolving the resulting ash in an acid, and diluting the resulting solution to a predetermined volume with purified water. The sample solution is analyzed by an ICP mass spectrometer 7500ce available from Agilent Technologies, Inc. through an ICP-MS standard addition method.

The iron compound (C) may be present, for example, as an iron oxide, an iron hydroxide, an iron chloride, or an iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate and iron sulfate, and organic salts such as iron carboxylates (e.g., iron acetate, iron butyrate, iron stearate, and the like). These may be used alone or in combination.

From the viewpoint of the dispersibility in the EVOH resin composition, the iron compound (C) is preferably water-soluble. From the viewpoint of the dispersibility and the productivity, the iron compound (C) typically has a molecular weight of 100 to 10,000, preferably 100 to 1,000, particularly preferably 100 to 500.

In the EVOH resin composition of the present disclosure, the weight ratio of the amount of the long Periodic Table 4th-period d-block metal compound (B) on a metal basis to the amount of the iron compound (C) on a metal basis is typically 0.02 to 50,000, preferably 1 to 30,000, particularly preferably 10 to 10,000, especially preferably 30 to 5,000.

If the weight ratio is excessively great, the heat stability tends to be deteriorated. If the weight ratio is excessively small, a product formed from the EVOH resin composition tends to be colored.

[Other Thermoplastic Resin]

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyamide resins, polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

[Other Additives]

The EVOH resin composition of the present disclosure may contain additives that are generally blended with the EVOH resin, as long as the effects of the present disclosure are not impaired. Examples of the additives include: plasticizer (e.g., aliphatic polyhydric alcohol such as ethylene glycol, glycerin or hexanediol); oxygen absorber [e.g., inorganic oxygen absorber such as aluminum powder or potassium sulfite; organic compound oxygen absorber such as ascorbic acid, ascorbic acid ester, polyhydric phenol compound (e.g., hydroquinone, gallic acid, hydroxyl-containing phenol aldehyde resin or the like), coordination compound obtained by coordination-bonding trivalent non-iron transition metal and nitrogen-containing compound such as porphyrins, macrocyclic polyamine complex or polyethyleneimine, terpene compound, reaction product obtained by reaction between amino acid and hydroxyl-containing reductive substance, triphenylmethyl compound, or the like; or polymer oxygen absorber such as coordination compound obtained by coordination-bonding nitrogen-containing resin and trivalent non-iron transition metal, blend of tertiary hydrogen-containing resin and trivalent non-iron transition metal, blend of unsaturated carbon-carbon bond-containing resin and trivalent non-iron transition metal, photo-oxidation degradative resin (e.g., polyketone), anthraquinone polymer (e.g., polyvinylanthraquinone), or mixture containing any of these blends and photo initiator (benzophenone or the like), peroxide scavenger (commercially available antioxidant or the like) or deodorant (active carbon or the like)]; and heat stabilizer, photo stabilizer, UV absorber, colorant, antistatic agent, surfactant (not serving as lubricant), antibacterial agent, antiblocking agent, and filler (e.g., inorganic filler or the like). These compounds may be used alone or in combination.

[EVOH Resin Composition Production Method]

Known examples of a method of producing the EVOH resin composition of the present disclosure include dry blending method, melt mixing method, solution mixing method, and impregnation method, which may be used in combination.

An example of the dry blending method is a method (i) including the step of dry-blending pellets of the EVOH resin (A) with at least one selected from the group consisting of the long Periodic Table 4th-period d-block metal compound (B) and the iron compound (C) by means of a tumbler or the like.

Examples of the melt mixing method include: a method (ii) including the steps of melt-kneading a dry blend of pellets of the EVOH resin (A) and at least one selected from the group consisting of the long Periodic Table 4th-period d-block metal compound (B) and the iron compound (C), and forming the resulting melt mixture into pellets or a product; and a method (iii) including the steps of adding at least one selected from the group consisting of the long Periodic Table 4th-period d-block metal compound (B) and the iron compound (C) to the EVOH resin (A) in a melted state, melt-kneading the resulting mixture, and forming the resulting melt mixture into pellets or a product.

Examples of the solution mixing method include: a method (iv) including the steps of preparing a solution by using commercially available pellets of the EVOH resin (A), adding at least one of the long Periodic Table 4th-period d-block metal compound (B) and the iron compound (C) to the solution, solidifying and forming the resulting solution into pellets, separating the pellets from the solution, and drying the pellets; and a method (v) including the steps of adding at least one of the long Periodic Table 4th-period d-block metal compound (B) and the iron compound (C) to a homogeneous solution (water/alcohol solution or the like) of the EVOH resin in the preparation of the EVOH resin (A), solidifying and forming the resulting solution into pellets, separating the pellets from the solution, and drying the pellets.

An example of the impregnation method is a method (vi) including the steps of bringing pellets of the EVOH resin (A) into contact with an aqueous solution containing at least one of the long Periodic Table 4th-period d-block metal compound (B) and the iron compound (C) to incorporate at least one of the long Periodic Table 4th-period d-block metal compound (B) and the iron compound (C) into the pellets of the EVOH resin (A), and then drying the resulting pellets.

In the present disclosure, any of the aforementioned different methods may be used in combination. Particularly, the melt mixing method is preferred, and the method (ii) is particularly preferred, because the resin composition produced by these methods is significantly improved in productivity and the effects of the present disclosure.

Pellets of the EVOH resin composition of the present disclosure to be produced by any of the aforementioned methods, and the pellets of the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a major diameter of 1.5 to 30 mm and a minor diameter of 1 to 10 mm, preferably a major diameter of 3 to 20 mm and a minor diameter of 2 to 6 mm, more preferably a major diameter of 3.5 to 10 mm and a minor diameter of 2.5 to 5.5 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

As described above, a water-soluble iron compound is used as the iron compound (C) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of a salt, in an ionized form, or in the form of a complex coordinated with the resin or other compound ligands in the EVOH resin composition.

Usable as the aqueous solution containing the iron compound in the method (vi) are an aqueous solution of the iron compound (C), and an aqueous solution that contains iron ions released from a steel material immersed in water containing chemical agents. In this case, the amount (on a metal basis) of the iron compound (C) to be contained in the EVOH resin composition may be controlled by adjusting the concentration of the iron compound (C) in the aqueous solution in which the pellets of the EVOH resin (A) are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C.

The pellets of the EVOH resin composition are separated from the aqueous solution by a known method, and dried by a known drying method. Various drying methods are usable for the drying, and examples of the drying methods include stationary drying method and fluidized drying method, which may be used alone or in combination.

The EVOH resin composition of the present disclosure typically has a water content of 0.01 to 0.5 wt. %, preferably 0.05 to 0.35 wt. %, particularly preferably 0.1 to 0.3 wt. %.

The water content of the EVOH resin composition of the present disclosure is measured and calculated in the following manner.

The weight (W1) of the EVOH resin composition is measured by an electronic balance before the drying, and the EVOH resin composition is dried at 150° C. for 5 hours in a hot air dryer and cooled for 30 minutes in a desiccator. Then, the weight (W2) of the resulting EVOH resin composition is measured. The water content of the EVOH resin composition is calculated from the following expression:

$$\text{Water content (wt. \%)} = [(W1-W2)/W1] \times 100$$

The pellets of the EVOH resin composition thus produced may be used as they are for the melt forming. In order to ensure stable feeding of the EVOH resin composition pellets in the melt forming, a known lubricant is preferably applied to surfaces of the pellets. Examples of the lubricant include: higher fatty acids (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols, ester oligomers, and fluorinated ethylene resins. The amount of the lubricant is typically not greater than 5 wt. %, preferably not greater than 1 wt. %, based on the weight of the EVOH resin composition.

The EVOH resin composition of the present disclosure may be prepared in any of various forms, e.g., in a pellet form, in a powdery form, or in a liquid form, for use as a forming material for various formed products. In the present disclosure, the EVOH resin composition is particularly preferably provided as a melt-formable material, because the effects of the present disclosure can be more efficiently provided. The EVOH resin composition of the present disclosure may be a resin composition prepared by mixing the EVOH resin composition with a resin other than the EVOH resin (A).

Exemplary products to be formed from the EVOH resin composition for practical applications include a single-layer film formed by using the pellets of the EVOH resin composition of the present disclosure, and a multilayer structure including a layer formed by using the pellets of the EVOH resin composition of the present disclosure.

[Multilayer Structure]

A multilayer structure produced by using the EVOH resin composition of the present disclosure includes a layer formed from the EVOH resin composition. The layer formed by using the EVOH resin composition of the present disclosure and containing the EVOH resin composition (hereinafter referred to simply as "EVOH resin composition layer") may be laminated with some other base material (hereinafter referred to as "base resin") containing a thermoplastic resin other than the EVOH resin composition of the present disclosure as a main component. Thus, the EVOH resin composition layer can be strengthened, protected from moisture and other influence, or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferably used as the hydrophobic resin.

Where EVOH resin composition layers a (a1, a2, ...) formed from the EVOH resin composition of the present disclosure and base resin layers b (b1, b2, ...) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and other thermoplastic resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer formed from the EVOH resin composition of the present disclosure and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. % of the resin). These may be used alone or in combination.

The EVOH resin composition layer formed by using the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition is laminated with the base resin by melt extrusion; a method in which the base resin layer is laminated with the EVOH resin composition by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is preferably close to the melting point of the multilayer structure, and is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property by applying cold air over the stretched film without performing the above heat-setting process.

In some case, a cup-shaped or tray-shaped multilayer container may be produced by using the multilayer structure described above. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/ adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

EXAMPLES

The embodiments of the present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Prior to implementation of Examples, pellets of the following EVOH resin (A) were prepared, and the amount of an iron compound (C) contained in the EVOH resin (A) was measured.

EVOH resin (A): Ethylene-vinyl alcohol copolymer having an ethylene structural unit content of 29 mol %, a saponification degree of 99.6 mol %, and an MFR of 3.9 g/10 minutes (as measured at 210° C. with a load of 2160 g)

[Measurement of Amount of Iron Compound (C)]

A sample was prepared by pulverizing the pellets of the EVOH resin (A), and 0.5 g of the sample was ashed in an infrared heating oven (in an oxygen stream at 650° C. for 1 hour). The resulting ash was dissolved in an acid, and the resulting solution was diluted to a predetermined volume with purified water, whereby a sample solution was prepared. The sample solution was analyzed by an ICP-MS (ICP mass spectrometer 7500ce available from Agilent Technologies, Inc.) through a standard addition method. As a result, the amount of the iron compound (C) was 0 ppm on a metal basis.

Example 1

The pellets of the EVOH resin (A), zinc stearate (b1) (Zn-St available from Nitto Kasei Co., Ltd.) as the long Periodic Table 4th-period d-block metal compound (B), and iron (III) phosphate n-hydrate (c1) (available from Wako Pure Chemical Industries, Ltd., and having a drying loss of 20.9 wt. % when being dried at 230° C.) as the iron compound (C) were dry-blended together, and then the resulting blend was melt-kneaded at 210° C. by a 20-mm diameter twin-screw extruder (L/D=25) and pelletized.

The amount of zinc stearate (b1) contained in the EVOH resin composition was 45 ppm on a zinc basis. The amount of iron (III) phosphate n-hydrate (c1) was 0.1 ppm on an iron basis. The weight ratio of the amount of the zinc stearate (b1) on a metal basis to the amount of the iron (III) phosphate n-hydrate (c1) on a metal basis was 450.

[Production of Multilayer Structure]

The EVOH resin composition prepared in the aforementioned manner, a linear low-density polyethylene (LLDPE) (UF240 available from Japan Polyethylene Corporation, and having an MFR of 2.1 g/10 minutes (as measured at 190° C. with a load of 2160 g)), and an adhesive resin (Admer NF528 available from Mitsui Chemicals, Inc., and having an MFR of 2.5 g/10 minutes (as measured at 190° C. with a load of 2160 g)) were fed into a 3-type 5-layer multilayer coextrusion cast film forming apparatus, whereby a 3-type 5-layer multilayer structure (film) of LLDPE layer/adhesive resin layer/EVOH resin layer/adhesive resin layer/LLDPE layer was produced under the following conditions by a multilayer coextrusion method. The thicknesses (μm) of the respective layers of the multilayer structure were 37.5/5/15/5/37.5. The die temperatures of the forming apparatus were all set at 210° C.

(Conditions for Multilayer Coextrusion)

Intermediate layer extruder (for EVOH resin composition): a 40-mm diameter single screw extruder (having a barrel temperature of 210° C.)

Upper and lower layer extruders (for LLDPE): 40-mm diameter single screw extruders (each having a barrel temperature of 210° C.)

Middle upper and lower layer extruders (for adhesive resin): 32-mm diameter single screw extruders (each having a barrel temperature of 210° C.)

Die: a 3-type 5-layer feed block T-die (having a die temperature of 210° C.)

Take-up speed: 10.0 m/minute

Roll temperature: 80° C.

<Impact Resistance Strength Evaluation>

The impact strength (kgf·cm) of the multilayer structure produced in the aforementioned manner was measured in a 23° C. and 50% RH atmosphere by means of an YSS type film impact tester (MODEL 181 available from Yasuda Seiki Seisakusho, Ltd.) The measurement was performed ten times. The impact strength values thus measured were averaged, and the multilayer structure was evaluated for impact resistance based on the impact strength average on the basis of the following criteria. The film impact tester had a clamp inner diameter of 60 mm, an impact ball radius of 12.7 mm, and a pendulum lift angle of 90 degrees.

A: The multilayer structure was superior in impact resistance with an impact strength of not less than 16.0 kgf·cm.

B: The multilayer structure was excellent in impact resistance with an impact strength of not less than 14.5 kgf·cm and less than 16.0 kgf·cm.

C: The multilayer structure was poor in impact resistance with an impact strength of not less than 13.0 kgf·cm and less than 14.5 kgf·cm.

D: The multilayer structure was very poor in impact resistance with an impact strength of less than 13.0 kgf·cm.

<Evaluation of EVOH Resin Composition for Stability (Color Tone)>

A sample for color tone evaluation was prepared by putting 5 g of the EVOH resin composition prepared in the aforementioned manner in a 30-mm diameter aluminum cup (DISPODISH PP-724 available from As One Corporation) and keeping the aluminum cup in an air atmosphere at 200° C. for three hours to heat-treat the EVOH resin composition. The color tone of the color tone evaluation sample was measured ten times by the following evaluation method by means of the following apparatus, and the color tone values thus measured were averaged. The color tone evaluation was performed based on the color tone average on the basis of the following criteria by the following evaluation method.

Instrument used: Visual analyzer IRIS VA400 (available from Alpha M.O.S. Japan K.K.)

Data analysis software: Alpha Software V14.3

Objective lens: 25 mm (available from Basler AG)

Lighting mode: Upper and lower lighting

Evaluation method: The color tone evaluation sample was set on a tray in a chamber of the visual analyzer, and the plane image of the entire color tone evaluation sample was photographed by a CCD camera. Then, the image was processed with the use of the data analysis software, whereby the color pattern of the sample was analyzed. The EVOH resin composition was evaluated for color tone stability based on the lightness (L*) of the highest percentage color (major color) on the basis of the following evaluation criteria:

A: After the heat treatment, the color tone was superior with L*≥65.

B: After the heat treatment, the color tone was excellent with 55≤L*<65.

C: After the heat treatment, the color tone was poor with L*<55.

Example 2

An EVOH resin composition and a multilayer structure were produced in substantially the same manner as in Example 1, except that zinc stearate (b1) was used in an amount of 10 ppm on a zinc basis based on the weight of the EVOH resin composition. The EVOH resin composition and the multilayer structure thus produced were evaluated in the same manner as in Example 1.

Example 3

An EVOH resin composition and a multilayer structure were produced in substantially the same manner as in Example 1, except that iron (III) phosphate n-hydrate (c1) was used in an amount of 1 ppm on an iron basis based on the weight of the EVOH resin composition. The EVOH resin composition and the multilayer structure thus produced were evaluated in the same manner as in Example 1.

Example 4

An EVOH resin composition and a multilayer structure were produced in substantially the same manner as in Example 1, except that zinc caprylate (b2) (Zn-08N available from Nitto Kasei Co., Ltd.) was used instead of zinc stearate (b1), and the amount of zinc caprylate (b2) was 45 ppm on a zinc basis based on the weight of the EVOH resin composition. The EVOH resin composition and the multilayer structure thus produced were evaluated in the same manner as in Example 1.

Example 5

An EVOH resin composition and a multilayer structure were produced in substantially the same manner as in Example 4, except that iron (III) phosphate n-hydrate (c1) was used in an amount of 1 ppm on a metal basis based on the weight of the EVOH resin composition. The EVOH resin composition and the multilayer structure thus produced were evaluated in the same manner as in Example 4.

Comparative Example 1

An EVOH resin composition and a multilayer structure were produced in substantially the same manner as in Example 1, except that iron (III) phosphate n-hydrate (c1) was not used. The EVOH resin composition and the multilayer structure thus produced were evaluated in the same manner as in Example 1.

Comparative Example 2

An EVOH resin composition and a multilayer structure were produced in substantially the same manner as in Example 4, except that iron (III) phosphate n-hydrate (c1) was not used. The EVOH resin composition and the multilayer structure thus produced were evaluated in the same manner as in Example 4.

Comparative Example 3

An EVOH resin composition and a multilayer structure were produced in substantially the same manner as in Example 1, except that iron (III) phosphate n-hydrate (c1) was used in an amount of 10 ppm on a metal basis based on the weight of the EVOH resin composition. The EVOH resin composition and the multilayer structure thus produced were evaluated in the same manner as in Example 1.

Comparative Example 4

An EVOH resin composition and a multilayer structure were produced in substantially the same manner as in Example 4, except that iron (III) phosphate n-hydrate (c1) was used in an amount of 10 ppm on a metal basis based on the weight of the EVOH resin composition. The EVOH resin composition and the multilayer structure thus produced were evaluated in the same manner as in Example 4.

Comparative Example 5

An EVOH resin composition and a multilayer structure were produced in substantially the same manner as in Example 1, except that magnesium stearate (d1) (SM-PG available from Sakai Chemical Industry Co., Ltd.) was used instead of zinc stearate (b1) as a metal compound (D) other than the long Periodic Table 4th-period d-block metal compound (B), and the amount of magnesium stearate (d1) was 4 ppm on a metal basis based on the weight of the EVOH resin composition, and that iron (III) phosphate n-hydrate (c1) was not used. The EVOH resin composition and the multilayer structure thus produced were evaluated in the same manner as in Example 1.

Comparative Example 6

An EVOH resin composition and a multilayer structure were produced in substantially the same manner as in Example 1, except that magnesium stearate (d1) was used instead of zinc stearate (b1), and the amount of magnesium stearate (d1) was 4 ppm on a metal basis based on the weight of the EVOH resin composition. The EVOH resin composition and the multilayer structure thus produced were evaluated in the same manner as in Example 1.

Comparative Example 7

An EVOH resin composition and a multilayer structure were produced in substantially the same manner as in Example 1, except that zinc stearate (b1) was not used. The EVOH resin composition and the multilayer structure thus produced were evaluated in the same manner as in Example 1.

The components of the EVOH resin compositions produced in the aforementioned manner and the evaluation results are shown below in Table 1.

TABLE 1

| | Example 1 | Example 2 | Example 3 | Example 4 | Example 5 | Comparative Example 1 |
|---|---|---|---|---|---|---|
| Long Periodic Table 4th-period d-block metal compound (B) | | | | | | |
| Type | Zinc stearate | Zinc stearate | Zinc stearate | Zinc caprylate | Zinc caprylate | Zinc stearate |
| Amount (ppm) on metal basis | 45 | 10 | 45 | 45 | 45 | 45 |
| Amount (ppm) of iron compound (C) on metal basis | 0.1 | 0.1 | 1 | 0.1 | 1 | — |
| Amount of long Periodic Table 4th-period d-block metal compound (B) on metal basis/Amount of iron compound (C) on metal basis | 450 | 103 | 45 | 450 | 45 | — |
| Impact strength [kgf · cm] | A (16.3) | B (15.9) | A (16.3) | A (17.6) | A (16.6) | A (16.1) |
| Stability (color tone L*) (in air atmosphere at 200° C. for three hours) | A (67.4) | A (69.2) | A (66.2) | A (71.8) | A (68.9) | C (53.8) |

| | Comparative Example 2 | Comparative Example 3 | Comparative Example 4 | Comparative Example 5 | Comparative Example 6 | Comparative Example 7 |
|---|---|---|---|---|---|---|
| Long Periodic Table 4th-period d-block metal compound (B) | | | | | | |
| Type | Zinc caprylate | Zinc stearate | Zinc caprylate | — (Magnesium stearate) | — (Magnesium stearate) | — |
| Amount (ppm) on metal basis | 45 | 45 | 45 | (4) | (4) | — |
| Amount (ppm) of iron compound (C) on metal basis | — | 10 | 10 | — | 0.1 | 0.1 |
| Amount of long Periodic Table 4th-period d-block metal compound (B) on metal basis/Amount of iron compound (C) on metal basis | — | 4.5 | 4.5 | — | (41) | — |
| Impact strength [kgf · cm] | A (16.4) | D (12.3) | C (13.3) | D (10.5) | D (11.3) | C (14.1) |
| Stability (color tone L*) (in air atmosphere at 200° C. for three hours) | C (54.3) | C (52.8) | B (58.1) | C (52.0) | A (68.4) | B (58.7) |

Comparative Examples 1 and 2 in which the long Periodic Table 4th-period d-block metal compound (B) was used and the iron compound (C) was not used were excellent in impact strength, but were poor in color tone stability during the heating. On the other hand, Comparative Examples 3 and 4 in which the long Periodic Table 4th-period d-block metal compound (B) was used and the iron compound (C) was used in a greater amount were poor in both impact strength and color tone stability during the heating. Further, Comparative Example 7 in which the long Periodic Table 4th-period d-block metal compound (B) was not used and the iron compound (C) was used in a specific very small amount, and Comparative Example 5 in which the metal compound (D) other than the long Periodic Table 4th-period d-block metal compound (B) was used and the iron compound (C) was not used were poor in both impact strength and color tone stability during the heating. Comparative Example 6 in which the metal compound (D) other than the long Periodic Table 4th-period d-block metal compound (B) was used and the iron compound (C) was used in a specific very small amount was poor in impact strength, but was excellent in color tone stability during the heating.

In contrast, Examples 1 to 5 of the present disclosure in which the long Periodic Table 4th-period d-block metal compound (B) and a specific very small amount of the iron compound (C) were used in combination were excellent in both impact resistance and color tone stability during the heating.

Next, Example 2 and Comparative Example 5 were evaluated for heat coloration-suppressing effect.

The EVOH resin compositions of Example 2 and Comparative Example 5 were each pulverized by operating a crusher (SKR16-240 available from Sometani Sangyo Co., Ltd.) at 650 rpm. The pulverized products of the EVOH resin compositions were in a granular form having a size of 1- to 5-mm square.

<Evaluation of EVOH Resin Compositions for Stability (Coloration)>

The pulverized products of the EVOH resin compositions of Example 2 and Comparative Example 5 were each used as a sample. Before heating, the YI value of the sample was measured by means of a spectrophotometer SE6000 available from Nippon Denshoku Industries Co., Ltd. At this time, the measurement was performed with the sample filled to the full in a cylinder having an inner diameter of 32 mm and a height of 30 mm. After the sample was heat-treated at 150° C. for 5 hours in an air atmosphere in an oven, the YI value of the heat-treated sample was measured in the same manner. Then, the ratio of the YI value after the heating to the YI value before the heating was calculated. A higher YI value ratio means that the resin composition was yellowed by the heating.

<Dynamic Viscosity Behavior>

The pulverized products of the EVOH resin compositions of Example 2 and Comparative Example 5 were each melt-kneaded at 230° C. by operating a plastograph (available from Brabender Corporation) at 50 rpm. The EVOH resin compositions were each evaluated based on a value obtained by dividing a torque observed at the end of measurement (after a lapse of 5 minutes) by a torque observed at the start of the measurement (after a lapse of 0 minute). A lower such value means that viscosity increase during the heating was suppressed. Further, the EVOH resin compositions were each evaluated based on a value obtained by dividing a torque observed at the start of measurement (after a lapse of 0 minute) by a torque observed at the end of the measurement (after a lapse of 120 minutes). A higher such value means that viscosity increase with time was suppressed and the dynamic viscosity behavior was excellent.

TABLE 2

| | Example 2 | Comparative Example 5 |
|---|---|---|
| Long Periodic Table 4th-period d-block metal compound (B) | | |
| Amount [ppm] of compound | 100 | (100) |
| Amount [ppm] on metal basis | 10 | (4) |
| Amount (ppm) of iron compound (C) on metal basis | 0.1 | — |
| YI before heating | 38.6 | 35.0 |
| YI after heating | 58.2 | 58.0 |
| YI after heating/YI before heating | 1.5 | 1.7 |
| Dynamic viscosity behavior (5 minutes/0 minute) | 1.01 | 1.01 |
| Dynamic viscosity behavior (0 minute/120 minutes) | 1.60 | 1.89 |

The EVOH resin composition of Example 2 of the present disclosure and the EVOH resin composition of Comparative Example 5 not containing the iron compound (C) were substantially the same in dynamic viscosity behavior (5 minutes/0 minute) and dynamic viscosity behavior (0 minute/120 minutes). This means that the viscosities of the EVOH resin compositions of Example 2 and Comparative Example 5 were similarly reduced with time by the heating.

Further, the EVOH resin composition of Example 2 of the present disclosure had smaller YI values before and after the heating as compared with the EVOH resin composition of Comparative Example 5 not containing the iron compound (C). This result indicates that the EVOH resin composition of the present disclosure is less susceptible to the coloration during the heating.

While specific forms of the embodiments of the present disclosure have been shown in the aforementioned examples, the examples are merely illustrative of the but not limitative. It is contemplated that various modifications apparent to those skilled in the art could be made within the scope of the disclosure.

The EVOH resin composition of the present disclosure is excellent in impact resistance and heat stability (color tone deterioration-suppressing effect and coloration-suppressing effect). Therefore, the multilayer structure including the layer of the EVOH resin composition of the present disclosure is useful as a material for various packaging material containers for general foods, condiments such as mayonnaise and dressing, fermented foods such as miso, fat and oil such as salad oil, beverages, cosmetics, and pharmaceutical products.

The invention claimed is:

1. An ethylene-vinyl alcohol copolymer composition comprising:
    (A) an ethylene-vinyl alcohol copolymer;
    (B) a compound of a long Periodic Table 4th-period d-block metal; and
    (C) an iron compound;
    wherein the ethylene-vinyl alcohol copolymer (A) comprises an ethylene structural unit content of 20 to 60 mol %;
    wherein the compound of a long Periodic Table 4th-period d-block metal (B) is a zinc organic salt;
        wherein the iron compound (C) is present in an amount of 0.01 to 5 ppm on a metal basis based on a weight of the ethylene-vinyl alcohol copolymer composition; and
    wherein a weight ratio of the amount of the long Periodic Table 4th-period d-block metal compound (B) on a metal basis to the amount of the iron compound (C) on a metal basis is 30 to 5,000.

2. The ethylene-vinyl alcohol copolymer composition according to claim 1, wherein the long Periodic Table 4th-period d-block metal compound (B) is present in an amount of 0.1 to 500 ppm on a metal basis based on the weight of the ethylene-vinyl alcohol copolymer composition.

3. The ethylene-vinyl alcohol copolymer composition according to claim 1, wherein a weight ratio of the amount of the long Periodic Table 4th-period d-block metal compound (B) on a metal basis to the amount of the iron compound (C) on a metal basis is 0.02 to 50,000.

4. The ethylene-vinyl alcohol copolymer composition according to claim 1, wherein the long Periodic Table 4th-period d-block metal compound (B) is a zinc carboxylate.

5. An ethylene-vinyl alcohol copolymer composition for melt forming, which comprises the ethylene-vinyl alcohol copolymer composition according to claim 1.

6. Pellets comprising the ethylene-vinyl alcohol copolymer composition according to claim 1.

7. A multilayer structure comprising a layer that comprises the ethylene-vinyl alcohol copolymer composition according to claim 1.

8. The ethylene-vinyl alcohol copolymer composition according to claim 1,
wherein the long Periodic Table 4th-period d-block metal compound (B) is a zinc carboxylate; and
wherein anion moieties of the zinc carboxylate each have 2 to 25 carbons.

9. The ethylene-vinyl alcohol copolymer composition according to claim 1, wherein a weight ratio of the amount of the long Periodic Table 4th-period d-block metal compound (B) on a metal basis to the amount of the iron compound (C) on a metal basis is 250 to 50,000.

* * * * *